United States Patent [19]

Slye et al.

[11] Patent Number: 5,261,820

[45] Date of Patent: Nov. 16, 1993

[54] COMPUTER SIMULATION PLAYBACK METHOD AND SIMULATION

[75] Inventors: Damon H. Slye; Paul R. Bowman; Lincoln Hutton, all of Eugene, Oreg.

[73] Assignee: Dynamix, Inc., Eugene, Oreg.

[21] Appl. No.: 632,955

[22] Filed: Dec. 21, 1990

[51] Int. Cl.$^5$ ............................................. G09B 19/22
[52] U.S. Cl. ...................................... 434/43; 434/118; 434/128; 434/307; 273/85 G; 273/237; 273/434; 273/DIG. 28; 364/410; 395/152
[58] Field of Search ....................... 434/14, 35, 38, 43, 434/69, 118, 307, 128; 273/85 G, 434, DIG. 28, 237, 238; 340/750; 364/410, 411; 395/500, 152; 371/19

[56] References Cited

U.S. PATENT DOCUMENTS

| 4,019,745 | 4/1977 | Mustelier | 273/237 |
| 4,342,454 | 8/1982 | Baer et al. | 340/726 X |
| 4,541,056 | 9/1985 | Matthews | 434/118 |
| 4,841,291 | 6/1989 | Swix et al. | 340/725 |

FOREIGN PATENT DOCUMENTS 0335030 10/1989 European Pat. Off. ............. 434/38
0343882 11/1989 European Pat. Off. .

OTHER PUBLICATIONS

Video game box and selected pages from the manual for the game "Their Finest Hour-The Battle of Britain," owned by Lucasfilm Games of San Rafael, Calif., 1989. "Playing the New Adult-rated Computer Games" by McComb., Popular Science, Jul., 1984, pp. 92-96 and 98.

Primary Examiner—Richard J. Apley
Assistant Examiner—Joe H. Cheng
Attorney, Agent, or Firm—Kolisch Hartwell Dickinson McCormack & Heuser

[57] ABSTRACT

The invented computer simulation playback method includes the steps of recording commands entered during use of a simulation, operating the simulation with the recorded commands and allowing new commands to be entered at any point during the step of operating the simulation with the recorded commands. More specifically, the invented method runs a simulation on a computer system that includes a user input device and a visual display. Images are shown on the display and the person using the simulation enters commands through the user input device. The commands affect the images shown on the visual display and are recorded in the sequence that they were entered. The method then runs the simulation again and automatically enters the recorded commands in the same sequence that they were recorded so that substantially the same images that were produced when the commands were initially entered are displayed again. During that step, new commands can be entered. Once certain new commands are entered, the recorded commands are preempted and the user can use the simulation anew from the point where the new commands were entered.

1 Claim, 8 Drawing Sheets

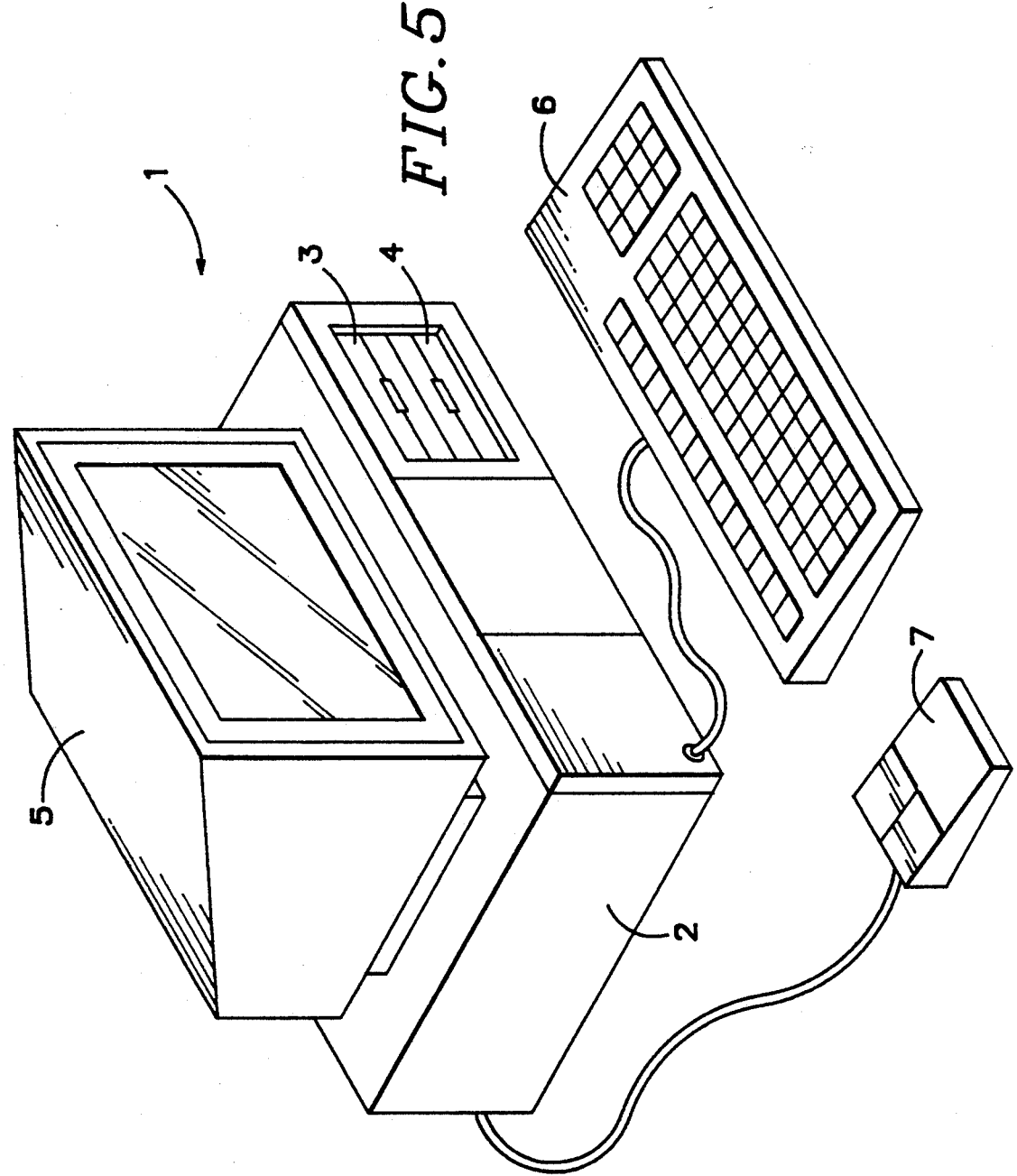

COMPUTER SIMULATION PLAYBACK METHOD AND SIMULATION

TECHNICAL FIELD

This invention relates to computer simulations and more particularly to a method of running and replaying computer simulations and video games. The invented method records the action of a simulation or video game and then replays it. During the replay, the user may enter the simulation or game at any point and begin using or playing it anew. This invention also relates to simulations and video games embodying the invented method.

BACKGROUND ART

Computer simulations and video games are, broadly stated, computer programs. They are run on computer systems that typically have a visual display such as a video screen and a user input device such as a keyboard, mouse, joystick, pedal or light gun. The simulation or game displays images on the computer system's video screen and those images depict the action of the simulation or game. The person using the simulation or game affects the action by entering predetermined commands through a user input device. For example, in an airplane dogfight video game, images of various airplanes are displayed on the screen and commands are entered through a joystick. The commands affect the movement and action of the planes.

A drawback of existing simulations and video games is that they do not allow a user to record the action of the simulation or game, replay it and then enter the simulation or game while the action is being replayed. The invented playback method and simulation address that drawback.

DISCLOSURE OF THE INVENTION

The invented computer simulation playback method runs on a computer system that includes a user input device. The user input device allows a user to enter commands affecting the action of the simulation. The method includes the steps of recording the commands entered during use, operating the simulation with the recorded commands and allowing new commands to be entered at any point during the step of operating the simulation with the recorded commands. More specifically, the invented method runs a computer simulation on a computer system that includes a user input device and a visual display. Images are shown on the display and the person using the simulation enters commands through the user input device. The commands affect the images shown on the visual display and are recorded in the sequence that they were entered. The method then runs the simulation again and automatically enters the recorded commands in the same sequence that they were recorded so that substantially the same images that were produced when the commands were initially entered are displayed again. During that step, new commands can be entered. Once certain new commands are entered, the recorded commands are preempted and the user can use or affect the action of the simulation from the point where the new commands were entered. Thus, the method can record and play back a previous simulation session and also allow a user to enter that recorded session and begin using it anew at any point. The invented simulation includes means for accomplishing those features, specifically, code that allows the computer system to store in memory the commands entered by the user.

BRIEF DESCRIPTION OF THE DRAWINGS

FIG. 5 is a block diagram showing a computer system which the invented computer simulation playback method may be implemented.

DETAILED DESCRIPTION AND BEST MODE FOR CARRYING OUT THE INVENTION

A computer simulation means any computer program run on a system to simulate a chosen environment, for example, a flight simulator. The method is particularly applicable to video games where the games simulate sporting events, fantasies, or historical events like the aerial dogfights of World War I. Thus, the definition of "computer simulation" includes video games. The use of a simulation may be referred to as the "play."

The invention is a method of replaying a computer simulation so that the person using the simulation can record the action of the simulation and reply it. The user can enter the action at any point while it is being replayed and begin entering new commands to change the recorded action. In a video game, the person playing the game can record the action of the game and then replay that recorded action. During replay, the user can enter the game and begin playing anew at any point.

Figure 1:
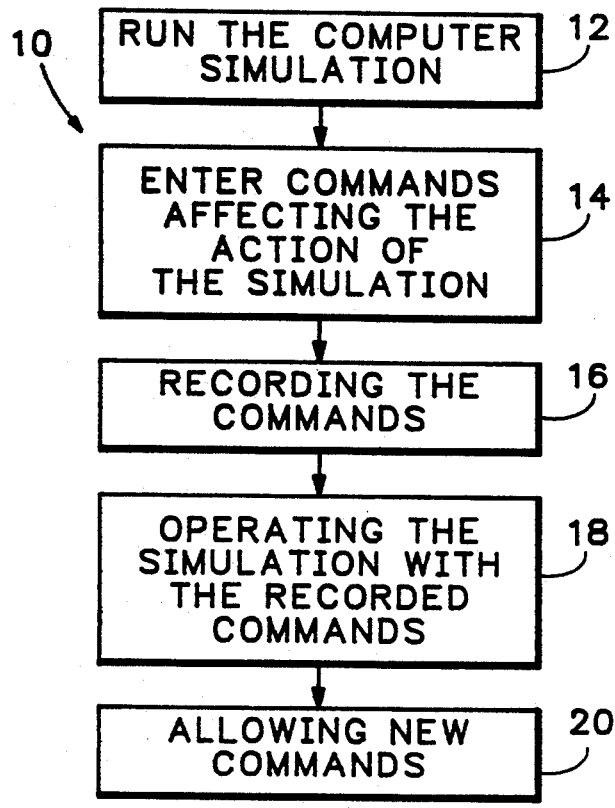
FIG. 1 is a flow chart outlining the steps of the invented computer simulation playback method.

FIG. 1 shows this method generally at 10. Initially, the person using the computer simulation must install it onto a computer system and run it, as illustrated at 12. Simulations may comprise software on one or more floppy disks. They are played on a computer system having a device that can read the program on the floppy disks and display images on a screen according to the program.

While the simulation is running, the user may enter commands that affect the action of the simulation, as illustrated at 14. Typically computer systems include one or more input devices such as a keyboard, a mouse, a joystick or a light gun. If, for example, the computer system includes a joystick and the simulation is an airplane dogfight video game, moving the joystick to the left may cause an airplane shown the on the computer system's screen to bank toward the left of the screen.

The commands entered by the user during play, as well as the sequence of the commands are recorded at step 16. The commands are recorded simply by saving them in memory, such as on a disk drive. Additionally, the initial settings of the simulation, such as the number and location of actors in the simulation, colors selected, et cetera, can all be saved. The simulation can then be played back by running it or operating it again with the same settings and by entering the previously recorded commands in their proper sequence, as shown in step 18. The result is a duplicate of the previously played simulation.

Block 20 allows the user to enter new commands while the simulation is played back. Thus, a user can replay a simulation and, by entering new commands, begin using it anew. The new commands can be entered at any point during playback.

Figure 2:
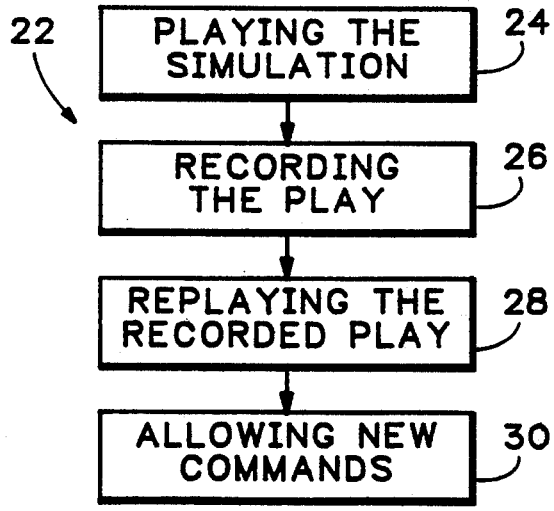
FIG. 2 is another flow chart outlining steps similar to those of FIG. 1.

FIG. 2 shows at 22 another perspective of the steps of the invented method. The simulation is played at step 24 and the resulting play is recorded at step 26. The play may include the images displayed while the simulation is played, the commands entered by the user playing the simulation, the initial settings or any combination of them. The recorded play is replayed at step 28 and step 30 allows new commands to be entered while the recorded play is replayed.

FIG. 2 differs from FIG. 1 because it covers a situation where a simulation is recorded by saving both the images displayed and the commands entered by the user. In FIG. 1, only the user's commands and initial settings were saved. Thus, the method may be thought of as interacting with a recorded or saved play. "Interacting" simply refers to the user of the simulation entering commands that alter the play of the simulation.

FIGS. 3a-f show a detailed flow chart outlining a specific application of the invented method. The specific application shown in FIGS. 3a-f is an airplane dogfight simulation. That simulation is referred to as a video game in the following text.

Figure 3A:
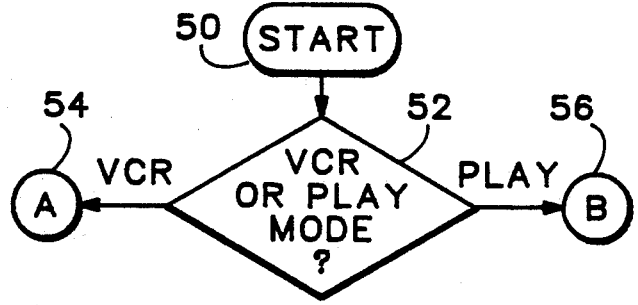
FIGS. 3*a-f* are detailed flow charts of an actual airplane dogfight simulation including the invented playback method.

The video game starts at 50 in FIG. 3a. After starting the game, a player is asked whether he wants to watch a previously recorded game session or play a new game session. That question is illustrated at step 52. Playing a recorded game session is similar to playing a videocassette on a videocassette recorder and therefore step 52 is phrased as "VCR OR PLAY MODE?" The "VCR" mode refers to playing back a recorded game session. If the player selects the "VCR" mode, the method advances to the steps labeled "A" at 54. The play mode refers to a new game session. If the user selects the play mode the method advances to the steps labeled "B" at 56.

Figure 3B:
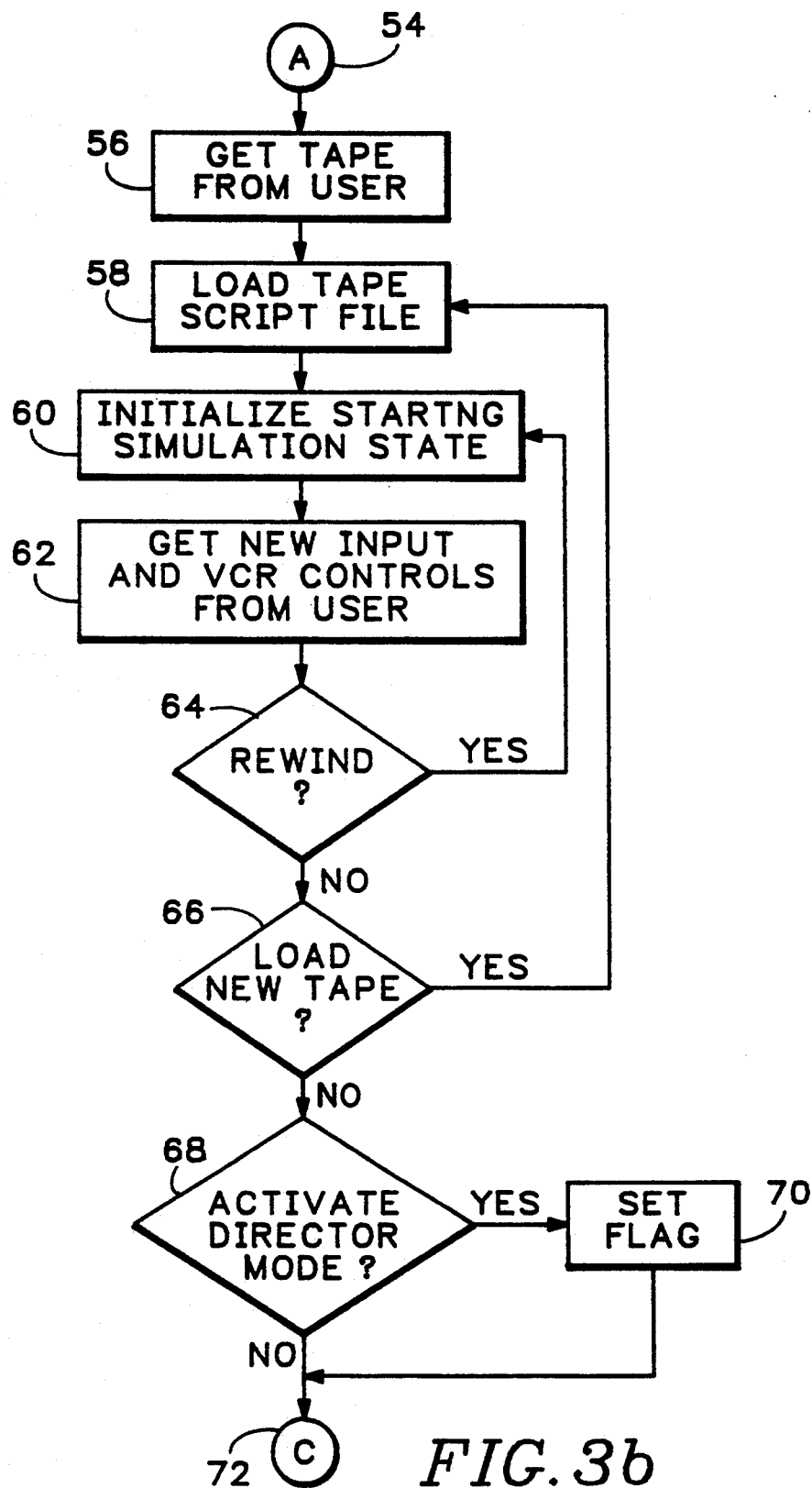

The steps following the label "A" begin at 54 in FIG. 3b. First, the method asks the user which game session he wants to play back, as symbolized by step 56. The word "tape" refers to a saved game session that includes the session's settings and action. The session may have been saved as a file in a memory device such as a hard disk or a floppy disk. Thus, the user would select a file which is then read by the computer. Because sessions can be saved to files on floppy disks, recorded game sessions can be transferred between different computer systems. Additionally, saved files can be sent to another computer system through a modem.

At step 58 the method loads the game settings from the recorded game session. The settings are referred to in step 58 as the "tape script file". In an airplane dogfight video game, the settings may include the type of airplane, the type of weapons, the opponent, player position and other similar settings. At step 60 the method initializes the game with the settings taken from the saved file. The terms "simulation state" in step 60 refer to settings such as those discussed above or such as the player location, orientation and locations of other actors in the game. "Simulation" refers to the action and environment simulated by the video game.

In the "VCR" mode, the player may enter certain commands at any time during the playback of the recorded game session. For example, the user may rewind the recorded session, fast forward the recorded session, exit the session, play another recorded session, or actually enter the session and begin playing anew. Additionally, while a recorded session is being played back, the user may want to see different views or perspectives of the game. Step 62 recognizes those types of commands from the user and represents the ability to enter those commands at any time. Steps 64, 66, 68, 74, 78 and 82 illustrate the specific commands.

If the user rewinds the recorded session at step 64, the method returns to step 60. If the user loads a new recorded session at step 66, the method returns to step 58.

Step 68 asks whether the "director mode" is activated. The "director mode" refers to the ability to edit certain characteristics of the recorded session. In other words, the user may edit and change a recorded session by entering new commands. If the user desires to make such changes, that desire is indicated at step 68. If the "director mode" is chosen, a flag is set at step 70 that is used later at steps 96 at 106. The method then follows the steps after the label "C" at 72.

Figure 3C:
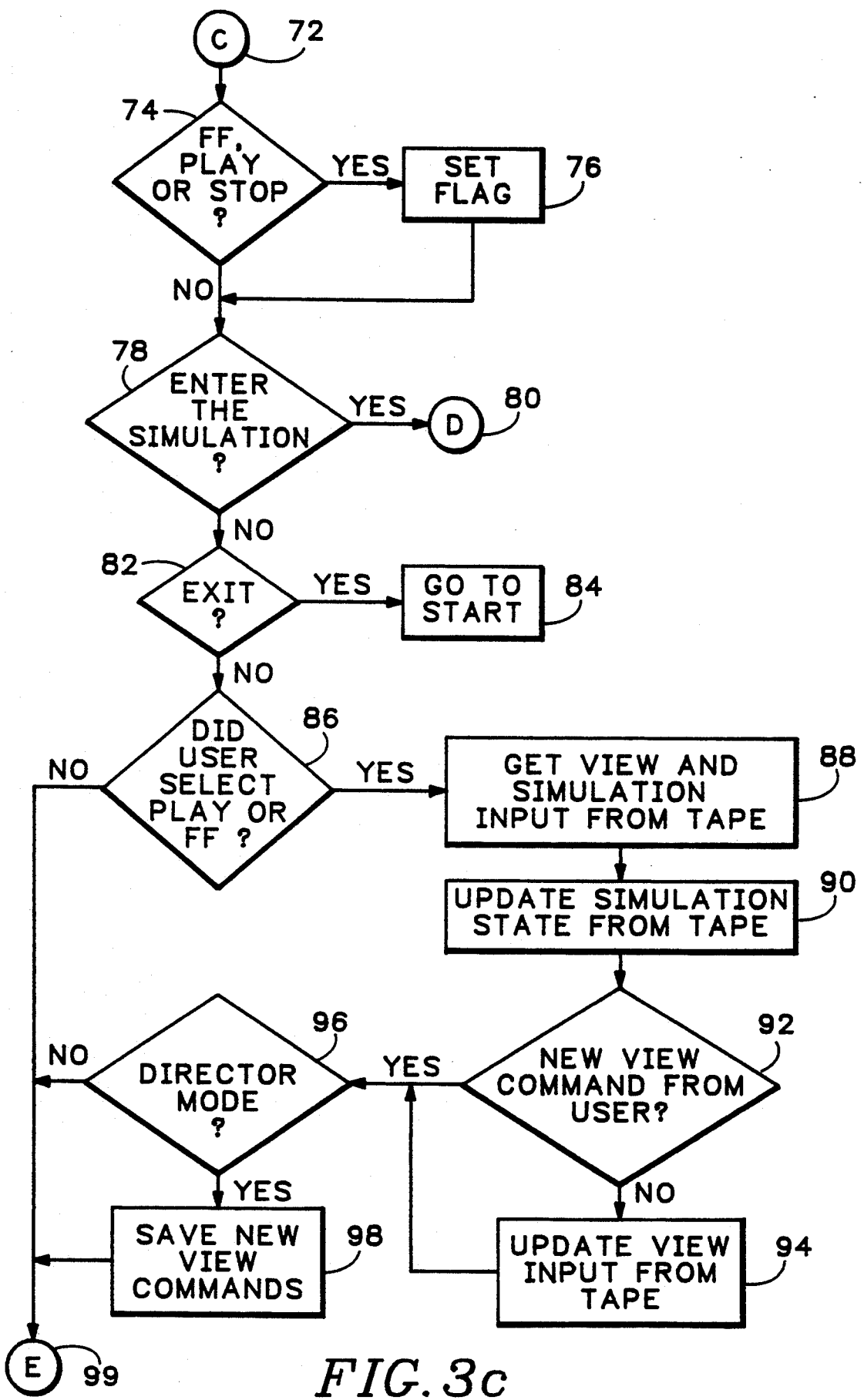

The fast forward, play or stop commands are recognized at step 74 as shown in FIG. 3c. The fast forward command allows a user to advance the recorded game session. The play command allows the user to display the recorded session on the computer system's screen. The stop command allows the user to stop playing or fast forwarding the recorded session. If the fast forward, play or stop command is selected, a flag is set at step 76 indicating that choice. The flag is used later to answer the question asked by step 86.

Step 78 asks whether the user wants to "enter the simulation". "Enter the simulation" means entering the recorded session and begin playing anew. If the user decides to enter the simulation, the method proceeds with the steps after the designator "D" at 80 in FIG. 3e.

The user may exit a recorded session at step 82 in FIG. 3c, in which case the method would return to the start, as shown at step 84.

At step 86 the method determines whether the user selected the play or fast forward commands. If so, the method gets the view and simulation input from the recorded session at step 88. In other words, the method gets the commands concerning how images are to be displayed from the recorded session. In an airplane dogfight game the view refers to the way the dogfight is displayed. It can be shown from the cockpit of a plane, from outside the plane, from different directions or from other perspectives. "Simulation input" refers to commands affecting the elements of the game such as the type of airplanes and weapons.

At step 90 the method updates the images from the commands retrieved at step 88. The invented method updates images displayed on the computer system on a frame-by-frame basis. In the described airplane dogfight game, approximately six frames per second are displayed in sequence on the computer system's visual display when the game is played on a computer system based on an Intel 80386 microprocessor running at 16 MHz. Each frame is updated according to user commands. Obviously, different computer systems can have different update speeds.

Step 92 refers to view commands entered by the user prior to the frame currently displayed and it recognizes when the user enters a new view command. Again, a view command is a command relating to the perspective of images displayed on the computer system's visual display. The user may want to look out from the cockpit of an airplane forward, backward or to a side. Alternatively, the user may want to be outside an airplane looking at it. If the user did not enter a new view command prior to the present frame, the images displayed by the computer system would be updated from the saved file or tape, as shown at step 94.

If new view commands were entered prior to the present frame, step 96 detects whether the user has selected the director mode. Again, the director mode allows the user to edit the recorded session. If the director mode is selected, the new view commands are saved at step 98 and the method proceeds with the steps following the label "F" at 99. If the user has not selected the director mode, the method proceeds with the steps following the label "F" at 99. As can be seen from this discussion, views can be edited on a recorded game session without entering that game and without giving commands to affect the action of the game.

Figure 3D:
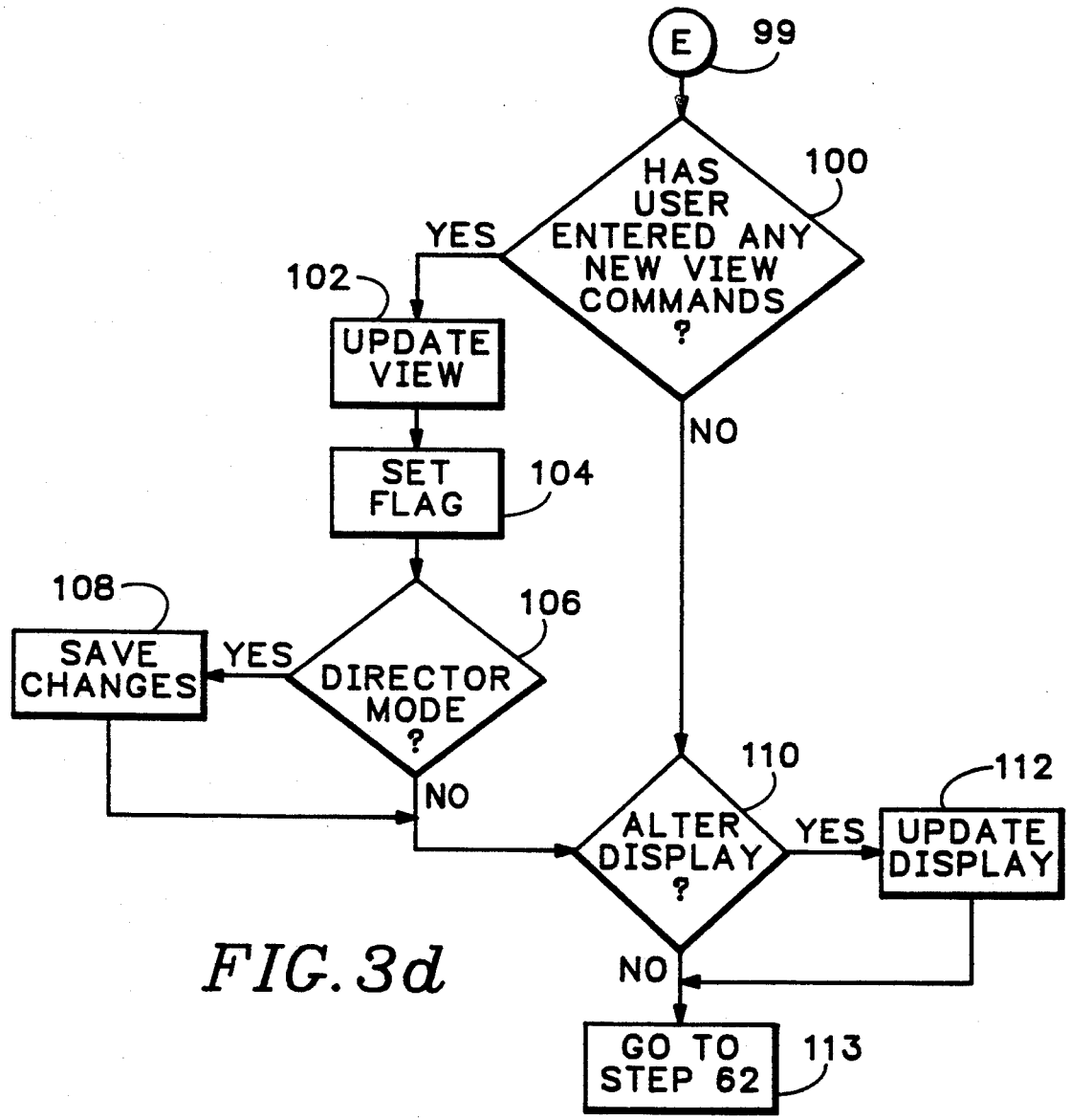

Step 100 in FIG. 3d asks whether the user has entered any new view commands during the time when the latest frame is displayed. If so, the view is updated at step 102 and a flag is set at step 104 indicating that the views have been updated. Step 106 inquires whether the director mode is operating and if so, the updated views are saved at step 108.

If the answer to either step 100 or step 106 is "no", or if the changes were saved at step 108, the method then determines at step 110 whether it should alter the images displayed. If the user has entered commands to alter the display, the display is updated at step 112. If the display is not to be altered, the method returns to step 62, as shown by block 113.

Figure 3E:
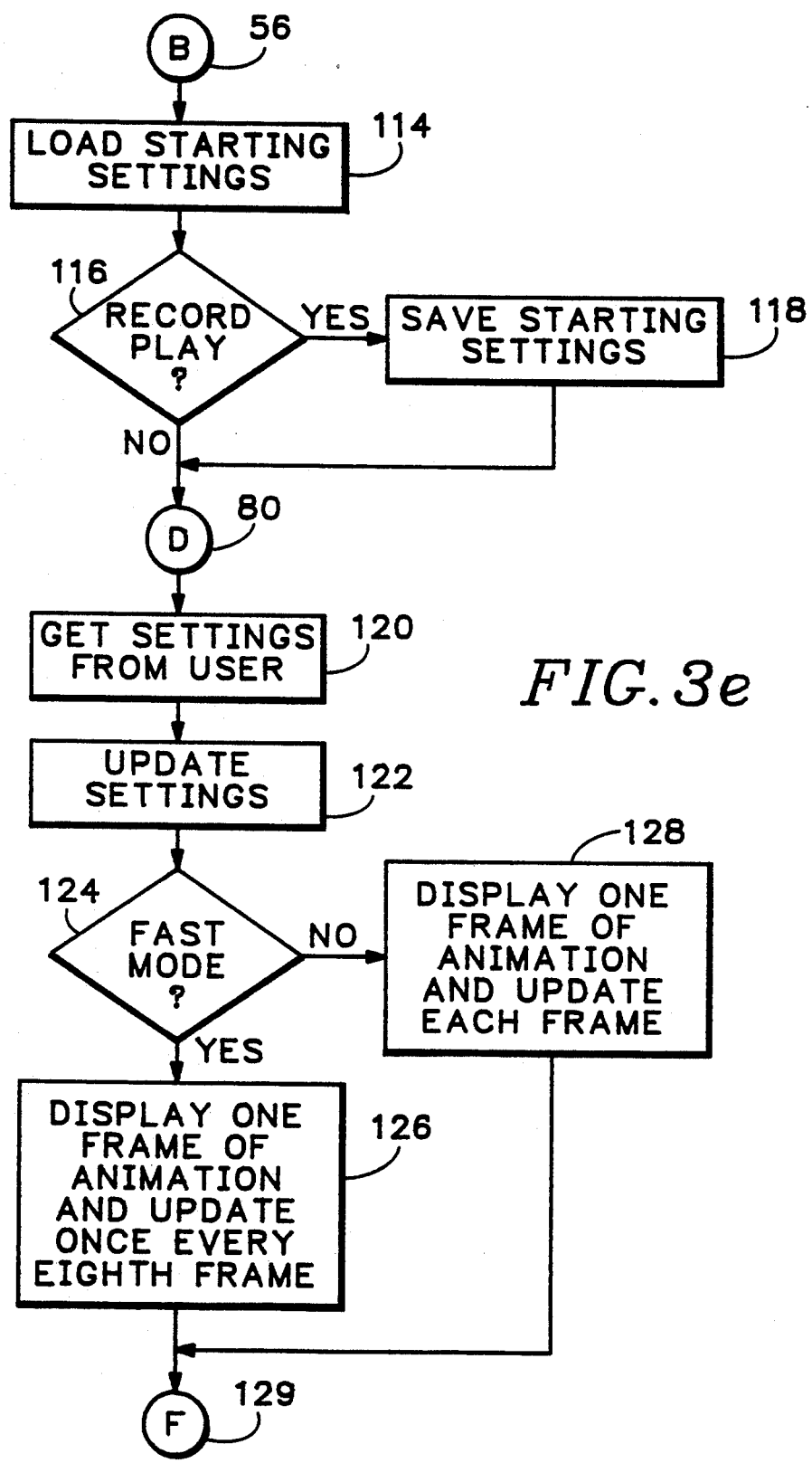

At the beginning of the game, if the user selected the play mode, then the method would proceed beginning with step 56, as shown in FIG. 3e. The default settings for the beginning of each new game play session are set at step 114. In the airplane dogfight game being described, the default setting for the record feature is off. Accordingly, step 116 asks the whether the user would like to record or save the game session. If the user decides to record the game session, the starting settings are saved at step 118 and the method proceeds to the steps following the label "D" at 80. If the user does not want to record his game session, the method proceeds directly to the steps following the label "D".

If the user desires to change any default settings, he does so at step 120. The new settings, if any, are updated at step 122.

The game may include a fast mode of play, as illustrated at step 124. If the fast mode of play is selected, the method proceeds to step 126 and the images displayed on the visual display are updated once out of every eight frames. Different updating rates can be used for different situations and different computer systems. If the user does not select the fast mode, each frame of animation is updated as the game is played, as shown in step 128. In either case, the method proceeds to the steps following the label "F" at 129.

Figure 3F:
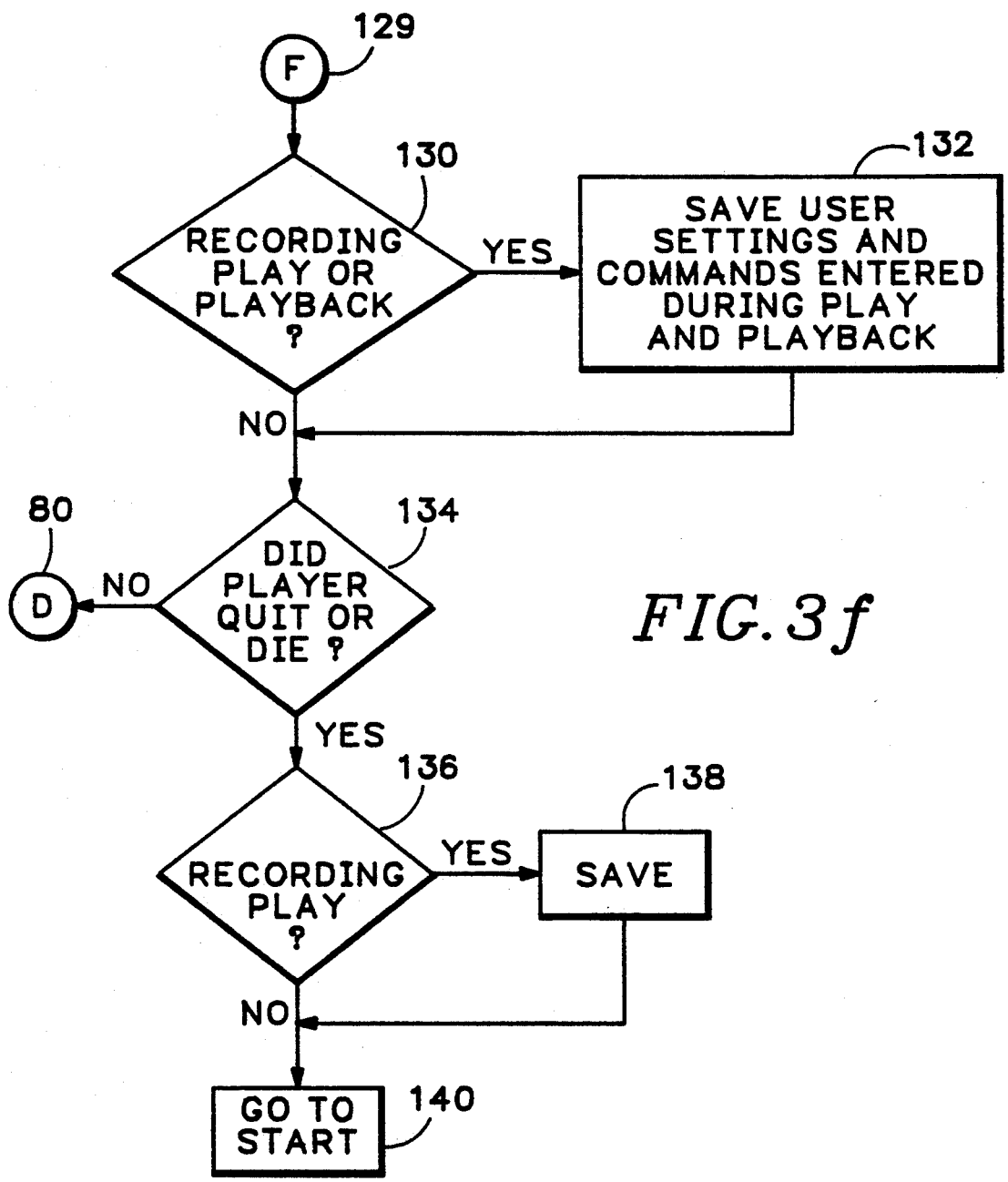

Step 130 in FIG. 3f asks whether the play session will be recorded and if so, the commands from the user changing the default settings are saved at step 132. The method then proceeds to step 134. If the game session is not being recorded the method proceeds directly to step 134.

Play proceeds until the user or player quits or is defeated in the game, as shown in step 134. In the airplane dogfight game, the player is defeated when he crashes or dies. If the player did not quit or die, the method simply repeats the steps described above, beginning with the steps following the label "D" at 80. When the player quits or dies, step 136 determines if the session is being recorded and if so it saves the outcome of the game at step 138 and returns to the start at step 140. If the game is not being recorded, the method returns to the start at step 140.

The above-described steps can be repeated on saved files. In other words, if a user replays a game session and enters that session and begins playing anew, the changes and new game play can also be saved. The user can then replay the new session and alter it. This can be repeated over and over until the user has created the "perfect" game session.

Figure 4:
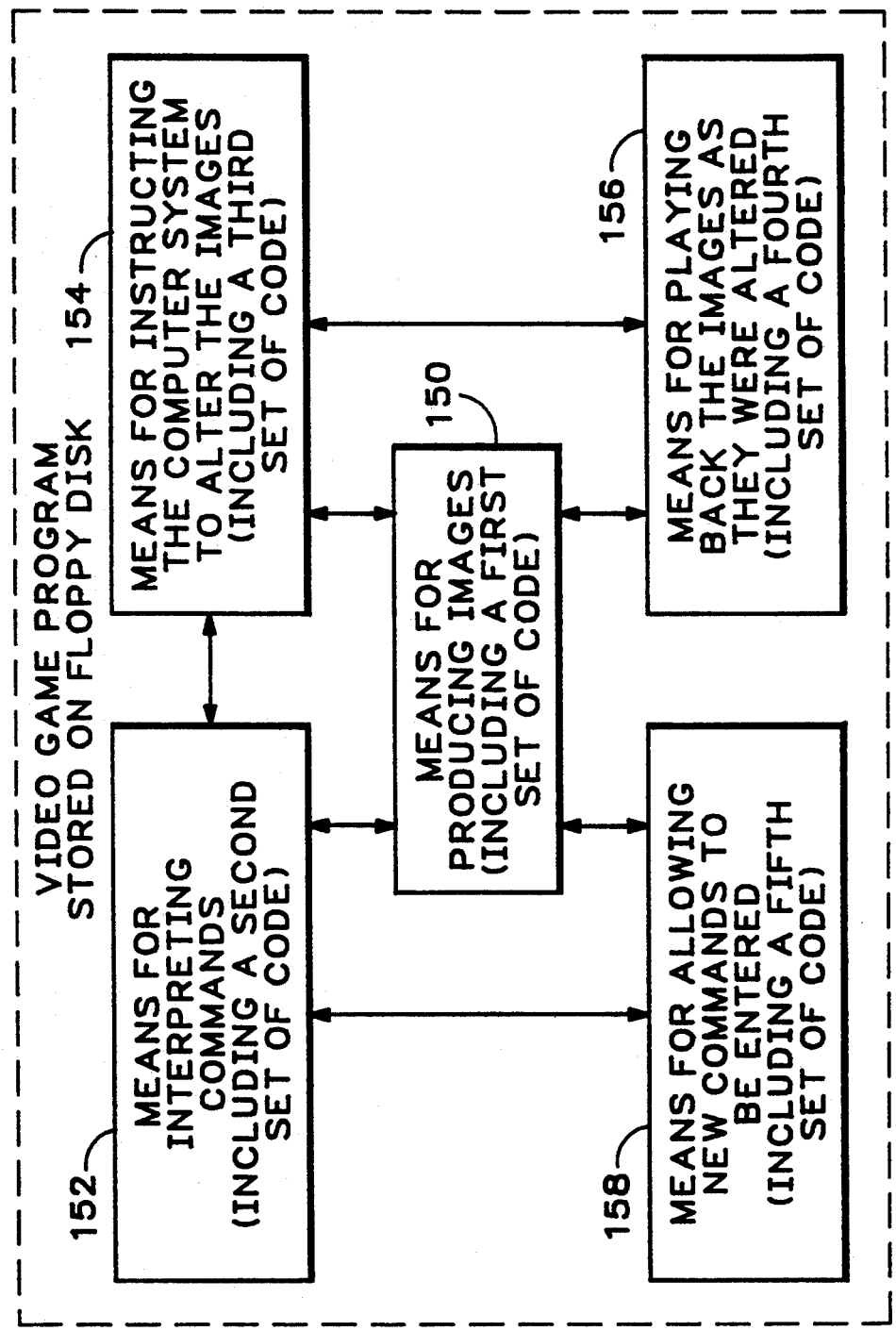
FIG. 4 is a block diagram showing a simulation that includes the invented playback method.

FIG. 4 is a block diagram illustrating a simulation incorporating the above-described method. The different features of the simulation include a means for producing images shown at 150, a means for interpreting commands shown at 152, a means for instructing the computer system to alter the images shown at 154, a means for playing back the images as they were altered shown at 156, and a means for allowing new commands to be entered as shown at 158. The means are all related so that their functions affect each other. For example, the means for producing images is typically a set of code that causes a computer system to generate certain images and to perform certain functions. Those images and functions are affected by commands from someone using the simulation. The means for interpreting those commands is typically another set of code that interacts with the code for producing images. Similarly, the means for instructing the computer system to alter the images is a set of code that works with means 152 and 150 to change the images produced by the computer system according to the user's commands. The means for playing back the images as they were altered includes yet another set of code that allows the computer system to store in memory the commands entered and to use the recorded commands to generate the same images that were generated when the commands were initially entered. The means for allowing new commands to be entered is also a set of code working with the others to further alter images while they are being played back. Any code that accomplishes the described features may be used. Storing the code on floppy discs results in an actual simulation that can be sold and used on different computer systems.

INDUSTRIAL APPLICABILITY

Referring briefly to FIG. 5, it may be seen that computer system 1 on which the invented method or simulation might be practiced may include a personal computer (PC) 2 (including a microprocessor and memory); one or more floppy disc drives 3, 4 for recording and playing back stored simulations; a visual display 5; and one or more input devices such as keyboard 6 and mouse 7. The memory within PC 2 and/or magnetic storage media within floppy disc drives 3, 4 may be seen to provide means for saving new commands that are entered during playback of a stored simulation, as described and illustrated above. Alternative input, processing, display and memory storage means may be used.

The invented playback method and device are applicable to the simulation and video game industries. Specifically, the invented playback method can be used in any simulation where a user wants to record a play session for subsequent viewing and altering. Expressed differently, the method simply plays back a recorded play and then allows a user to interact with that recorded play as it is played back to alter the play. It is applicable whenever those features are desired.

While the preferred embodiment and best mode of the invention have been disclosed, variations and changes may be made without departing from the spirit of the invention.

We claim:

1. A video game designed for play on a computer system having a visual display and a user input device that allows a user to enter commands that affect the action of the game, the game comprising:

means usable on the computer system for producing images on the visual display, the means usable on the computer system for producing images on the visual display including a first set of code that defines visual features of the game;

means usable on the computer system for interpreting commands entered by the user of the input device, the means usable on the computer system for interpreting commands entered by the user of the input device including a second set of code that recognizes predetermined commands;

means usable on the computer system for instructing the computer system to alter the images produced by the means for producing images on the visual display according to the commands entered by the user of the input device and interpreted by the means for interpreting, the means usable on the computer system for instructing the computer system to alter the images according to the commands entered by the use of the input device including a third set of code that instructs the computer system how to alter the images according to the commands entered;

means usable on the computer system for playing back images produced by the means for producing images as they were altered by the means for instructing, the means usable on the computer system for playing back the images as they were altered including a fourth set of code that allows the computer system to store in memory the commands entered and to use the recorded commands to generate the same images that were generated when the commands were initially entered; and means usable on the computer system for allowing new commands to be entered and interpreted by the means for interpreting at any point while the images are played back by the means for playing back images, where the new commands further alter the images, and the means usable on the computer system for allowing new commands to be entered at any point when the images are played back including a fifth set of code that allows the computer system to further alter the images, where all the sets of code are stored on at least one floppy disk.

* * * * *